(12) United States Patent
Ono

(10) Patent No.: US 8,656,705 B2
(45) Date of Patent: Feb. 25, 2014

(54) EXHAUST GAS PURIFICATION DEVICE

(75) Inventor: Taisuke Ono, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 677 days.

(21) Appl. No.: 12/918,649

(22) PCT Filed: Feb. 20, 2009

(86) PCT No.: PCT/JP2009/052980
§ 371 (c)(1),
(2), (4) Date: Nov. 19, 2010

(87) PCT Pub. No.: WO2009/104723
PCT Pub. Date: Aug. 27, 2009

(65) Prior Publication Data
US 2011/0056186 A1   Mar. 10, 2011

(30) Foreign Application Priority Data

Feb. 22, 2008   (JP) .................................. 2008-041403

(51) Int. Cl.
*F01N 3/00* (2006.01)
*F01N 3/02* (2006.01)
*F01N 3/20* (2006.01)

(52) U.S. Cl.
USPC .................. 60/287; 60/286; 60/292; 60/295; 60/299; 60/300

(58) Field of Classification Search
USPC ................... 60/286, 292, 295, 287, 299, 300
See application file for complete search history.

(56) References Cited

U.S. PATENT DOCUMENTS

| 7,716,918 B2 | 5/2010 | Gabe et al. |
| 2005/0223699 A1 | 10/2005 | Ancimer et al. |

(Continued)

FOREIGN PATENT DOCUMENTS

| JP | 5-125930 A | 5/1993 |
| JP | 2005-207281 A | 8/2005 |

(Continued)

OTHER PUBLICATIONS

Machine Translation JP 2006-083746; Done May 13, 2013.*

(Continued)

*Primary Examiner* — Thomas Denion
*Assistant Examiner* — Dapinder Singh
(74) *Attorney, Agent, or Firm* — Crowell & Moring LLP

(57) ABSTRACT

A method for controlling an exhaust gas purification device 1 equipped with branch exhaust passages 2 and 3 connected to an exhaust passage 100 on the engine side; a shutoff valve 4 capable of shutting off exhaust gas at the exhaust inlets 2a and 3a of the branch exhaust passages 2 and 3; a nitrogen oxide adsorbing material 5, disposed inside each of the branch exhaust passages 2 or 3, temporarily adsorbing nitrogen oxides in an excess air atmosphere, and detaching the adsorbed nitrogen oxides in a rising temperature atmosphere or a reducing atmosphere; a first combustion device 6, disposed on the exhaust upstream side of the nitrogen oxide adsorbing material 5 inside each of the branch exhaust passages 2 or 3, having an air nozzle 61, and changing the air supplied from the air nozzle 61 into the rising temperature atmosphere or the reducing atmosphere; and a second combustion device 7, disposed on the exhaust downstream side of the nitrogen oxide adsorbing material 5 inside each of the branch exhaust passages 2 or 3 and including an air nozzle 71, a fuel nozzle 72 and an ignition nozzle 73, wherein the ratio of fuel and air supplied from the first combustion device 6 is controlled within the range of $0.6 < \lambda 1 < 1.0$, where $\lambda 1$ is an excess air ratio.

5 Claims, 10 Drawing Sheets

(56) References Cited

U.S. PATENT DOCUMENTS

| | | | |
|---|---|---|---|
| 2006/0283172 A1* | 12/2006 | Leone et al. | 60/274 |
| 2008/0066449 A1* | 3/2008 | Murata et al. | 60/285 |
| 2008/0141663 A1 | 6/2008 | Ono | |
| 2009/0013674 A1* | 1/2009 | Ono | 60/311 |

FOREIGN PATENT DOCUMENTS

| | | |
|---|---|---|
| JP | 2006-502345 A | 1/2006 |
| JP | 2006-83746 A | 3/2006 |
| JP | 2006-112313 A | 4/2006 |
| JP | 2006-242011 A | 9/2006 |
| JP | 3852461 B2 | 9/2006 |
| JP | 2006-272115 A | 10/2006 |
| JP | 2006-274875 A | 10/2006 |
| WO | WO 2006/103915 A1 | 10/2006 |

OTHER PUBLICATIONS

Japanese Office Action dated Aug. 7, 2012 (Four (4) sheets).
International Search Report dated May 19, 2009 with English translation (five (5) pages).

* cited by examiner

EXHAUST GAS PURIFICATION DEVICE

TECHNICAL FIELD

The present invention relates to a device purifying exhaust gas discharged from internal combustion engines, such as diesel engines, gas engines, gasoline engines or gas turbine engines, or burning appliances, such as combustion furnaces and boilers, more particularly, to an exhaust gas purification device, connected to the exhaust passage of an internal combustion engine or the like performing normal operation in an excess air state, and eliminating nitrogen oxides.

BACKGROUND ART

Harmful components, such as nitrogen oxides, carbon monoxide and hydrocarbons, are contained in exhaust gas discharged from internal combustion engines, etc. Various kinds of devices have been developed conventionally to eliminate such substances from the exhaust gas thereby to purify the exhaust gas.

The applicant of the present invention developed an exhaust gas purification device and has already applied for a patent (Patent document 1). FIG. 10 shows an exhaust gas purification device shown in FIG. 1 of Patent document 1. As shown in FIG. 10, in the conventional exhaust gas purification device proposed by the applicant, a nitrogen oxide adsorbing material 204, a first combustion device (adsorbed material detachment unit) 203 and a second combustion device 205 are provided for each of a plurality of branch exhaust passages 202a and 302b connected to an internal combustion engine or the like. The exhaust gas discharged from the internal combustion engine or the like, is supplied only to one of the branch exhaust passages, i.e., 202a (or 202b), and not supplied to the other branch exhaust passage 202b (or 202a). Furthermore, in the branch exhaust passage 202a to which the exhaust gas is supplied, nitrogen oxides are adsorbed onto the nitrogen oxide adsorbing material 204 and eliminated, and carbon monoxide and hydrocarbons are oxidized to carbon dioxide and water by the oxidation catalyst contained in the nitrogen oxide adsorbing material 204. On the other hand, in the branch exhaust passage 202b to which the supply of the exhaust gas is shut off, nitrogen oxides are detached from the nitrogen oxide adsorbing material 204 by the first combustion device 203, and the detached nitrogen oxides are reduced to nitrogen by the second combustion device 205. In other words, normal operation in which nitrogen oxides are adsorbed onto the nitrogen oxide adsorbing material 204 is performed in the one branch exhaust passage 202a. At the same time, in the other branch exhaust passage 202b, regeneration operation in which nitrogen oxides are detached from the adsorbed material detachment unit 204 is performed. As a result, the adsorption capability of the nitrogen oxide adsorbing material 204 is maintained.

The exhaust gas purification device shown in FIG. 10 is a purification device that does not use a three-way catalyst, ammonia, urea, etc. The three-way catalyst serving as a catalyst capable of decomposing nitrogen oxides, carbon monoxide and hydrocarbons simultaneously does not act effectively in an excess air condition. In the case of a purification device that uses ammonia, etc., the device itself is very complicated and expensive. In addition, maintenance cost is necessary for ammonia, etc. serving reducing agents, and it is necessary to provide a system for supplying ammonia, etc., whereby many problems occur. In the exhaust gas purification device shown in FIG. 10, these problems have been solved. The exhaust gas purification device shown in FIG. 10 can eliminate harmful components (nitrogen oxides, carbon monoxide and hydrocarbons) from the exhaust gas discharged from an internal combustion engine or the like operating in an excess air condition to purify the exhaust gas and can maintain its purification capability without lowering the capability.

Patent document 1: Japanese Patent Application Laid-open Publication No. 2006-272115

SUMMARY OF INVENTION

Technical Problem

In the case of detaching nitrogen oxides from the nitrogen oxide adsorbing material using the combustion device (the first combustion device) as in the exhaust gas purification device shown in FIG. 10, it is necessary to properly maintain the amounts of fuel and air supplied from the combustion device. In other words, the excess air ratio (the value obtained by dividing the air-fuel ratio of the supplied mixture gas by an ideal air-fuel ratio) obtained due to use of the combustion device has an optimum value. If the excess air ratio is too smaller than the optimum value, the stability of combustion is impaired and the characteristic of discharging particles is degraded. On the other hand, if the excess air ratio is too larger than the optimum value, the amount of a reducing agent (unburned matters produced in the combustion reaction) required for the reaction of detaching the nitrogen oxides becomes scarce, whereby the regeneration (the detachment of the nitrogen oxides) of the nitrogen oxide adsorbing material becomes insufficient or the time required for the regeneration increases. As a result, when the excess air ratio has the optimum value, the consumption energy (the amount of fuel consumption in the combustion device) required for the regeneration of the nitrogen oxide adsorbing material becomes smallest.

The present invention is intended to provide a control method minimizing the consumption energy required for the regeneration of a nitrogen oxide adsorbing material in an exhaust gas purification device configured so that nitrogen oxides are detached from the nitrogen oxide adsorbing material using combustion devices.

Solution to Problem

An aspect of the present invention is to provide a method for controlling an exhaust gas purification device, wherein the exhaust gas purification device comprising: a plurality of branch exhaust passages connected to an exhaust passage on the engine side of an internal combustion engine or a burning appliance; an exhaust gas shutoff unit switching between allowing and shutting off the flow of the exhaust gas into the respective branch exhaust passages from the exhaust passage on the engine side by opening or closing the exhaust inlets of the respective branch exhaust passages; a nitrogen oxide adsorbing material, disposed inside each of the respective branch exhaust passages, temporarily adsorbing nitrogen oxides in an excess air atmosphere, and detaching the adsorbed nitrogen oxides in a rising temperature atmosphere or a reducing atmosphere; a first combustion device disposed on the exhaust upstream side of the nitrogen oxide adsorbing material inside each of the respective branch exhaust passages and comprising an air supply unit, a fuel supply unit and an ignition unit; and a second combustion device disposed on the exhaust downstream side of the nitrogen oxide adsorbing material inside each of the respective branch exhaust passages and comprising an air supply unit, a fuel supply unit and an ignition unit, and wherein there are normal operation and regeneration operation performed in the respective branch exhaust passages, the method comprising the steps of: allowing the flow of the exhaust gas into the branch exhaust passage subjected to the normal operation by the switching of the exhaust gas shutoff unit during the normal operation; operating the first combustion device and the second combustion device while the exhaust gas is prevented from flowing into the branch exhaust passage subjected to the regeneration operation by the switching of the exhaust gas shutoff unit during the regeneration operation; and controlling the ratio of fuel and air within the range of $0.6<\lambda 1<1.0$, where $\lambda 1$ is an excess air ratio, the fuel and the air being supplied from the first combustion device inside the branch exhaust passage subjected to the regeneration operation.

It is preferable that the aspect of the present invention adopts the following configurations (a) to (f).

(a) The aspect of the present invention is to provide the method further comprising: delaying the ignition time from the supply beginning time of fuel and air in the first combustion device inside the branch exhaust passage subjected to the regeneration operation.

(b) The aspect of the present invention is to provide the method further comprising: detecting the temperature of the nitrogen oxide adsorbing material inside the branch exhaust passage subjected to the regeneration operation by a temperature detector disposed on the exhaust upstream side of the nitrogen oxide adsorbing material; and operating the ignition unit of the first combustion device inside the branch exhaust passage subjected to the regeneration operation when the temperature of the nitrogen oxide adsorbing material is lower than the temperature at which the oxidation reaction of the fuel on the nitrogen oxide adsorbing material is started.

(c) The aspect of the present invention is to provide the method wherein the exhaust gas purification device further comprising: an auxiliary air supply unit on the exhaust downstream side of the air supply unit of the second combustion device inside each of the branch exhaust passages, wherein the space from the air supply unit of the second combustion device to the auxiliary air supply unit is defined as a fuel rich combustion zone, and wherein the space within the exhaust downstream side of the auxiliary air supply unit is defined as a fuel lean combustion zone, the method further comprising: controlling the amounts of the fuel and air supplied from the first combustion device and the second combustion device so that the excess air ratio $\lambda 2$ in the gas inside the fuel rich combustion zone is within the range of $0.5<\lambda 2<1.0$ and the excess air ratio $\lambda 3$ in the gas inside the fuel lean combustion zone is within the range of $1.0<\lambda 3<1.6$ inside the branch exhaust passage subjected to the regeneration operation.

(d) The aspect of the present invention is to provide the method wherein the nitrogen oxide adsorbing material contains one of Pt, Rh and Pd as a component thereof, the method further comprising: controlling the amounts of the fuel and air supplied from the first combustion device and the second combustion device so that the excess air ratio $\lambda 4$ of the gas inside the space within the exhaust downstream side of the air supply unit in the second combustion device is within the range of $1.0<\lambda 4<1.6$ inside the branch exhaust passage subjected to the regeneration operation.

(e) The aspect of the present invention is to provide the method further comprising: operating the second combustion device inside each of the branch exhaust passages at the starting period of the internal combustion engine or the burning appliance.

(f) The aspect of the present invention is to provide the method further comprising: operating the first combustion device in an excess air condition inside each of the branch exhaust passages at the starting period of the internal combustion engine or the burning appliance.

Advantageous Effects of Invention

According to the first aspect of the present invention, since the excess air ratio $\lambda 1$ is controlled within the range of $0.6<\lambda 1<1.0$, the amount of the energy required for regeneration is suppressed low while the nitrogen oxide adsorbing material can be regenerated sufficiently.

Furthermore, according to the configuration (a), since the ignition time is delayed from the supply beginning time of fuel and air in the first combustion device, the combustion of the mixture gas of the fuel and air is started in a state in which the mixture gas of the fuel and air is distributed uniformly inside a space around the nitrogen oxide adsorbing material. Therefore, temperature rising, detachment and reduction reactions are started uniformly in the space around the nitrogen oxide adsorbing material, and the nitrogen oxides are reduced effectively.

Furthermore, according to the configuration (b), in the case that the temperature of the nitrogen oxide adsorbing material is higher than the temperature at which the oxidation catalyst components of the nitrogen oxide adsorbing material spontaneously start the oxidation reaction of the fuel, the ignition unit of the first combustion device is not operated. Therefore, while the first combustion device is used to function as a device generating a rising temperature atmosphere and a reducing atmosphere, and the service life of the ignition unit can be extended.

Furthermore, according to the configuration (c), since the excess air ratio $\lambda 2$ is controlled within the range of $0.5<\lambda 2<1.0$ and the excess air ratio $\lambda 3$ is controlled within the range of $1.0<\lambda 3<1.6$, the reduction ratio of nitrogen oxides in the exhaust gas purification device is maintained high and the discharge amount of particulate matter is suppressed low.

Furthermore, according to the configuration (d), since the nitrogen oxide adsorbing material contains one of Pt, Rh and Pd as a component thereof, it is not necessary to provide a combustion device reducing the nitrogen oxides. Furthermore, since the second combustion device causes a combustion reaction in an excess air condition ($1.0<\lambda 4<1.6$), the unburned matters (carbon monoxide and hydrocarbons) are also rendered harmless. As a result, the amount of energy consumption is decreased in comparison with the case in which the combustion reaction is caused in an excess fuel atmosphere to reduce the nitrogen oxides.

Furthermore, according to the configuration (e), since the second combustion device is operated in an excess air condition at the starting period of the internal combustion engine or the like, black smoke and unburned matters (carbon monoxide and hydrocarbons) generated at the starting period of the internal combustion engine or the like are oxidized and rendered harmless when passing through the branch exhaust passages.

Furthermore, according to the configuration (f), since the first combustion device is operated in an excess air condition at the starting period of the internal combustion engine or the like, the nitrogen oxide adsorbing material is warmed quickly, and the adsorption performance of the nitrogen oxide adsorbing material is delivered properly from the starting period. In addition, the unburned matters (carbon monoxide and hydrocarbons) generated at the starting period of the internal combustion engine or the like are oxidized and rendered harmless when passing through the branch exhaust passages.

Figure 1:
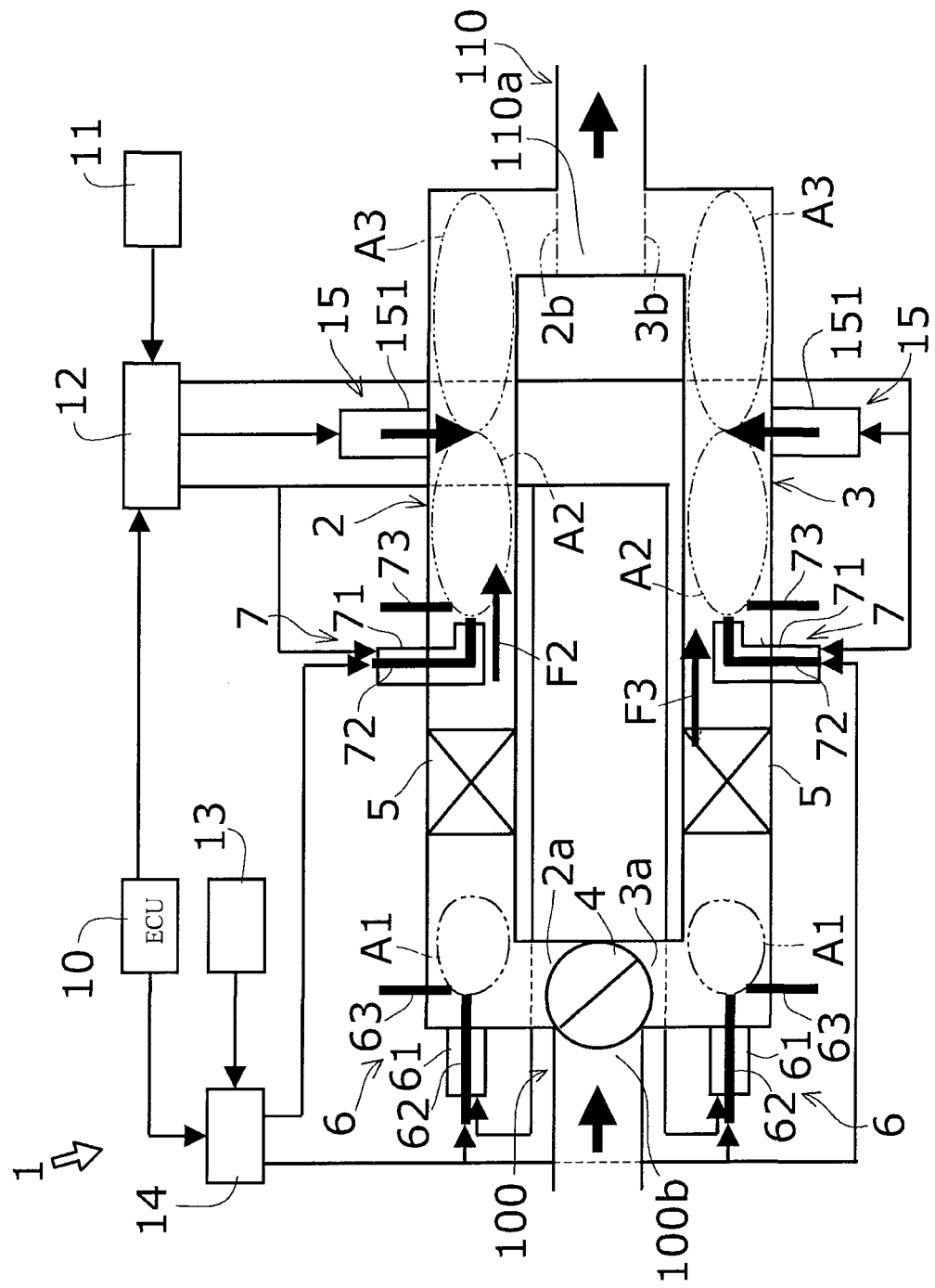
FIG. 1 is a schematic view showing an exhaust gas purification device (a first embodiment)

REFERENCE SIGNS LIST 1 exhaust gas purification device
2, 3 branch exhaust passage
2a, 3a exhaust inlet
2b, 3b exhaust outlet
4 shutoff valve
5 nitrogen oxide adsorbing material
6 first combustion device
7 second combustion device
10 controller
15 auxiliary air supply unit
61, 71, 151 air nozzle (a part of air supply unit)
62, 72 fuel nozzle (a part of fuel supply unit)
63, 73 ignition plug (ignition unit)
100 exhaust passage on the engine side
100b exhaust outlet

DESCRIPTION OF EMBODIMENTS

Configuration of First Embodiment

An exhaust gas purification device 1 according to a first embodiment will be described below referring to FIG. 1. The exhaust gas purification device 1 is a device connected to an exhaust passage 100 on the engine side of an internal combustion engine or a burning appliance.

The internal combustion engine or the burning appliance burns a mixture gas of air and fuel and produces exhaust gas. The exhaust gas contains nitrogen oxides (NOx); carbon monoxide (CO) and hydrocarbons (HC) as unburned matters; etc. The exhaust passage 100 on the engine side is an exhaust passage provided for the internal combustion engine or the burning appliance. The exhaust gas generated in the internal combustion engine or the burning appliance is discharged from the exhaust passage 100 on the engine side.

FIG. 1 shows the exhaust passage 100 on the engine side, a plurality (two in this embodiment) of branch exhaust passages 2 and 3, and a junction exhaust passage 110, these serving as exhaust gas passages. The branch exhaust passages 2 and 3 are exhaust passages provided for the exhaust gas purification device 1. The exhaust outlet 100b of the exhaust passage 100 on the engine side is connected to the exhaust inlets 2a and 3a of the branch exhaust passages 2 and 3. The exhaust outlets 2b and 3b of the branch exhaust passages 2 and 3 are connected to the junction exhaust passage 110a. These exhaust passages 100, 2, 3 and 110 are passages shut off from the outside air and composed of pipes, for example. The junction exhaust passage 110 may be an exhaust passage provided for the exhaust gas purification device 1 or may be the exhaust passage of the internal combustion engine or the burning appliance.

The exhaust gas from the exhaust passage 100 on the engine side flows from the exhaust inlet 2a to the exhaust outlet 2b inside the branch exhaust passage 2 and flows from the exhaust inlet 3a to the exhaust outlet 3b inside the branch exhaust passage 3. Therefore, the direction from the exhaust inlet 2a to the exhaust outlet 2b in the branch exhaust passage 2 is defined as exhaust direction F2 in the following description. Similarly, the direction from the exhaust inlet 3a to the exhaust outlet 3b in the branch exhaust passage 3 is defined as exhaust direction F3.

The exhaust gas purification device 1 is equipped with a controller (electronic control unit) 10. The controller 10 controls various devices (described later) provided for the exhaust gas purification device 1.

The exhaust gas purification device 1 is equipped with an exhaust gas shutoff unit capable of shutting off the flow of the exhaust gas into the respective branch exhaust passages 2 from the exhaust passage 100 on the engine side and 3 by closing the exhaust inlets 2a and 3a of the branch exhaust passages 2 and 3.

More specifically, the junction portion of the exhaust passage 100 on the engine side and the branch exhaust passages 2 and 3 is provided with a gas shutoff valve 4 as the exhaust gas shutoff unit. The gas shutoff valve 4 shuts off or allows the flow of the exhaust gas into the exhaust inlets 2a and 3a of the branch exhaust passages 2 and 3 from the exhaust outlet 100b of the exhaust passage 100 on the engine side. The switching by the shutoff valve 4 between shutting off and allowing the flow is controlled by the controller 10. The exhaust gas shutoff unit may be a group of changeover valves each provided for each of the respective branch exhaust passages 2 and 3. In this case, each of the changeover valves is provided at each of the exhaust inlet 2a of the branch exhaust passage 2 and the exhaust inlet 3a of the branch exhaust passage 3.

The exhaust gas purification device 1 is equipped with a nitrogen oxide adsorbing material 5, a first combustion device 6, a second combustion device 7 and an auxiliary air supply unit 15 inside each of the branch exhaust passages 2 and 3. The first combustion device 6, the nitrogen oxide adsorbing material 5, the second combustion device 7 and the auxiliary air supply unit 15 are arranged in this order from the upstream side to the downstream side in each of the exhaust directions F2 inside each of the branch exhaust passages 2 and 3.

The nitrogen oxide adsorbing material 5 is a material, temporarily adsorbing the nitrogen oxides in an excess air atmosphere, and detaching the adsorbed nitrogen oxides in a rising temperature atmosphere or a reducing atmosphere.

Here, an excess air state is defined as a state in which the excess air ratio (the value obtained by dividing the air-fuel ratio of the supplied mixture gas by the ideal air-fuel ratio) in the mixture gas of air (oxygen) and fuel is larger than one. In addition, a state in which the excess air ratio is smaller than one is an excess fuel state. A reducing atmosphere is defined as a gas being in a state in which the amount of a reducing agent is excessive and the amount of oxygen is insufficient when combustion (oxidation-reduction reaction) occurs.

Furthermore, the nitrogen oxides are detached from the nitrogen oxide adsorbing material 5 in the following three cases. In a first case of detachment, the nitrogen oxide adsorbing material 5 is placed in a rising temperature atmosphere. In a second case of detachment, the nitrogen oxide adsorbing material 5 is placed in a reducing atmosphere. In a third case of detachment, the nitrogen oxide adsorbing material 5 is placed in the rising temperature atmosphere and the reducing atmosphere.

In the case that the oxidation catalyst component contained in the nitrogen oxide adsorbing material 5 is one of noble metals, such as Pt, Pd or Pd, and that the nitrogen oxide adsorbing material 5 is placed in the rising temperature atmosphere and the reducing atmosphere, the nitrogen oxides are reduced to nitrogen when detached from the nitrogen oxide adsorbing material 5. In this embodiment, the first combustion device 6 provides the rising temperature atmosphere and the reducing atmosphere simultaneously.

The first combustion device 6 is a detachment unit, having an air supply unit, and changing the air supplied from the air supply unit into the rising temperature atmosphere and the reducing atmosphere.

The first combustion device 6 includes an air supply unit, a fuel supply unit and an ignition unit. Furthermore, the first combustion device 6 performs a combustion reaction in an excess fuel condition and generates unburned matters (carbon monoxide and hydrocarbons) serves as reducing agents, thereby attaining temperature rising by the heat of the combustion reaction.

The air supply unit of the first combustion device 6 is equipped with an air supply unit 11, an air amount adjustment unit 12 and an air nozzle 61. The air supply unit 11 takes in outside air and supplies the air to the air amount adjustment unit 12. The air amount adjustment unit 12 adjusts the amount of the supplied air (outside air) and supplies the air to the air nozzle 61. The air nozzle 61 is a nozzle being open in a first combustion zone A1 inside each of the branch exhaust passages 2 and 3. The air supplied to the air nozzle 61 is injected into each of the branch exhaust passages 2 and 3. The controller 10 controls the air amount adjustment unit 12, thereby adjusting the amount of the air supplied to the air nozzle 61.

The fuel supply unit of the first combustion device 6 is equipped with the controller 10, a fuel tank 13, a fuel amount adjustment unit 14 and a fuel nozzle 62. Fuel is stored in the fuel tank 13. The fuel amount adjustment unit 14 adjusts the amount of the fuel supplied from the fuel tank 13 and supplies the fuel to the fuel nozzle 62. The fuel nozzle 62 is a nozzle being open in the first combustion zone A1 inside each of the branch exhaust passages 2 and 3. The first combustion zone A1 is positioned on the exhaust upstream side of the nitrogen oxide adsorbing material 5. The fuel supplied to the fuel nozzle 62 is injected into each of the branch exhaust passages 2 and 3. Furthermore, the controller 10 controls the fuel amount adjustment unit 14, thereby adjusting the amount of the fuel supplied to the fuel nozzle 62.

The ignition unit of the first combustion device 6 is an ignition plug 63. The ignition plug 63 is a device performing ignition inside each of the branch exhaust passages 2 and 3. The air injected from the air nozzle 61 is mixed with the fuel injected from the fuel nozzle 62 to form a mixture gas in the first combustion zone A1 inside each of the branch exhaust passages 2 and 3. The ignition plug 63 ignites this mixture gas to cause combustion.

The first combustion device 6 generates a rising temperature atmosphere and a reducing atmosphere on the exhaust downstream side of the first combustion device 6. The rising temperature atmosphere is generated by the combustion heat of the mixture gas. The reducing atmosphere is generated by the production of unburned matters (carbon monoxide and hydrocarbons) by virtue of the combustion of the mixture gas.

Therefore, the first combustion device 6 has the air supply unit and serves as a unit changing the air supplied from the air supply unit into the rising temperature atmosphere or the reducing atmosphere.

Exactly speaking, the position of the first combustion device 6 in each of the branch exhaust passages 2 and 3 indicates the positions of the air nozzle 61, the fuel nozzle 62 and the ignition plug 63. The air nozzle 61, the fuel nozzle 62 and the ignition plug 63 of the first combustion device 6 are components directly relating to each of the branch exhaust passages 2 and 3.

The second combustion device 7 includes an air supply unit, a fuel supply unit and an ignition unit. The second combustion device 7 reduces the nitrogen oxides to nitrogen in a local excess fuel zone (second combustion zone A2, described later) inside a combustion flame.

The air supply unit of the second combustion device 7 is similar to the air supply unit of the first combustion device 6. The air supply unit of the second combustion device 7 is equipped with the air supply unit 11, the air amount adjustment unit 12 and an air nozzle 71. In other words, the air nozzle 61 in the air supply unit of the first combustion device 6 is replaced with the air nozzle 71 in the air supply unit of the second combustion device 7. The air nozzle 71 is open in a second combustion zone A2 inside each of the branch exhaust passages 2 and 3.

The fuel supply unit of the second combustion device 7 is also similar to the fuel supply unit of the first combustion device 6. The fuel supply unit of the second combustion device 7 is equipped with the fuel tank 13, the fuel amount adjustment unit 14 and a fuel nozzle 72. In other words, the fuel nozzle 62 in the air supply unit of the first combustion device 6 is replaced with the fuel nozzle 72 in the fuel supply unit of the second combustion device 7. The fuel nozzle 72 is open in the second combustion zone A2 inside each of the branch exhaust passages 2 and 3.

The ignition unit of the second combustion device 7 is also similar to the ignition unit of the first combustion device 6. The ignition unit of the second combustion device 7 is an ignition plug 73 that is used to perform ignition in the second combustion zone A2 inside each of the branch exhaust passages 2 and 3.

The auxiliary air supply unit 15 is disposed on the exhaust downstream side of the air supply unit of the second combustion device 7 inside each of the branch exhaust passages 2 and 3. The auxiliary air supply unit 15 is similar to the air supply units of the first combustion device 6 and the second combustion device 7. The auxiliary air supply unit 15 is equipped with the air supply unit 11, the air amount adjustment unit 12 and an air nozzle 151. The air nozzle 151 is equivalent to the air nozzle 61 of the first combustion device 6 and the air nozzle 71 of the second combustion device 7. The air nozzle 151 is open in a third combustion zone A3 inside each of the branch exhaust passages 2 and 3.

The ranges of the combustion zones A1, A2 and A3 are determined as described below. The combustion zones A1, A2 and A3 are defined as zones inside each of the branch exhaust passages 2 and 3 in which the combustion reactions by means of the combustion devices 6 and 7 occur. The range of the first combustion zone A1 is a predetermined range within the exhaust downstream side of the air nozzle 61. The range of the second combustion zone A2 is a range from the air nozzle 71 to the air nozzle 151 in each of the exhaust directions F2 and F3. The range of the third combustion zone A3 is a range from the air nozzle 151 to a predetermined position on the exhaust downstream side of the air nozzle 151 in each of the exhaust directions F2 and F3. The range of each of the combustion zones A1 and A3 is determined depending on the speed of the air injected from each of the air nozzle 61 and the air nozzle 151, the excess air ratio of the mixture gas, etc.

The combustion zones A1, A2 and A3 are filled with the mixture gas and a burned gas generated by burning the mixture gas. The combustion devices 6 and 7 and the auxiliary air supply unit 15 are controlled so that the excess air ratios of the gases filled inside the combustion zones A1, A2 and A3 have the following values. The mixture gas is supplied to the first combustion zone A1 from the first combustion device 6. The first combustion device 6 is controlled so that the excess air ratio $\lambda 1$ of the mixture gas has a value indicating an excess fuel state ($\lambda 1 < 1$). A first burned gas generated by combustion in the first combustion zone A1 and a mixture gas generated by the second combustion device 7 are supplied to the second combustion zone A2. The second combustion device 7 is controlled so that the excess air ratio $\lambda 2$ of the mixture gas of these gases has a value indicating an excess fuel state ($\lambda 2 < 1$). A second burned gas generated by combustion in the second combustion zone A2 and air from the auxiliary air supply unit 15 are supplied to the third combustion zone A3. The auxiliary air supply unit 15 is controlled so that the excess air ratio $\lambda 3$ of the mixture gas of these gases has a value indicating an excess air state ($\lambda 3 > 1$).

Because of the relationships among the above-mentioned excess air ratios, the second combustion zone A2 is a fuel rich combustion zone in which the mixture gas in an excess fuel state is burned. Furthermore, the third combustion zone A3 is a fuel lean combustion zone in which the mixture gas in an excess air state is burned.

Operation of First Embodiment

Next, the operation of the exhaust gas purification device 1 will be described below. The controller 10 operates the exhaust gas purification device 1. Normal operation or regeneration operation is performed in each of the branch exhaust passages 2 and 3 by the controller 10.

During the normal operation, the exhaust gas discharged from the exhaust passage 100 on the engine side of the internal combustion engine or the like is passed through the branch exhaust passages 2 and 3, and the nitrogen oxides contained in the exhaust gas are adsorbed onto the nitrogen oxide adsorbing material 5. One or all of the branch exhaust passages 2 and 3 are subjected to the normal operation. The controller 10 switches the shutoff valve 4 so that the branch exhaust passage subjected to the normal operation communicates with the exhaust passage 100 on the engine side. In this embodiment in which the number of the branch exhaust passages is two, the following three cases are available: a first case in which the exhaust passage 100 on the engine side communicates with the branch exhaust passage 2, a second case in which the exhaust passage 100 on the engine side communicates with the branch exhaust passage 3, and a third case in which the exhaust passage 100 on the engine side communicates with the branch exhaust passages 2 and 3. The controller 10 does not operate the first combustion device 6, the second combustion device 7 and the auxiliary air supply unit 15 inside the branch exhaust passage subjected to the normal operation.

During the regeneration operation, after the nitrogen oxides adsorbed onto the nitrogen oxide adsorbing material 5 inside each of the branch exhaust passages 2 and 3 by virtue of the normal operation are detached from the nitrogen oxide adsorbing material 5, the nitrogen oxides are reduced to nitrogen and rendered harmless. One of the branch exhaust passages 2 and 3 is subjected to the regeneration operation. Since the normal operation is performed in at least one of the branch exhaust passages when the exhaust gas purification device 1 is in operation, not all the branch exhaust passages are subjected to the regeneration operation simultaneously. The controller 10 switches the shutoff valve 4 so that the communication between the branch exhaust passage subjected to the regeneration operation and the exhaust passage 100 on the engine side is shut off. The controller 10 operates the first combustion device 6, the second combustion device 7 and the auxiliary air supply unit 15 inside the branch exhaust passage subjected to the regeneration operation.

When the operation of the internal combustion engine or the like connected to the exhaust gas purification device 1 is started, the controller 10 starts the operation of the exhaust gas purification device 1. The controller 10 performs the normal operation or the regeneration operation in each of the branch exhaust passages 2 and 3 when the exhaust gas purification device 1 operates.

Figure 2:
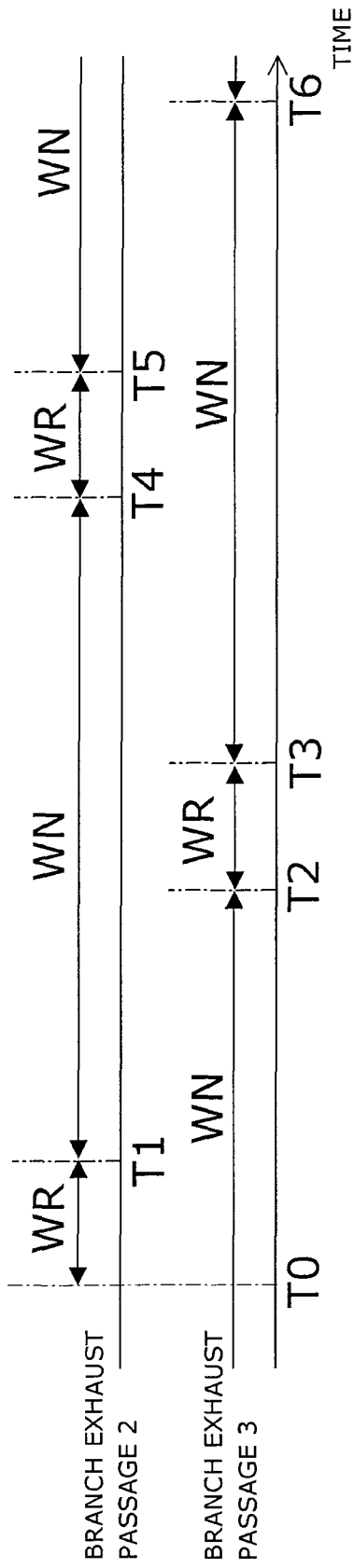
FIG. 2 is a time table for normal operation and regeneration operation in branch exhaust passages.

FIG. 2 is a time table for the normal operation and the regeneration operation in the respective branch exhaust passages 2 and 3. In each of the branch exhaust passages 2 and 3, the normal operation and the regeneration operation are performed periodically and repeatedly. The continuous implementation time of the normal operation is defined as normal operation time WN, and the continuous implementation time of the regeneration operation is defined as regeneration operation time WR. The normal operation in the branch exhaust passage 2 is partly overlapped with the normal operation in the branch exhaust passage 3 along the time axis. On the other hand, the branch exhaust passages 2 and 3 are not subjected to the regeneration operation simultaneously.

The controller 10 starts the regeneration operation in the branch exhaust passage 2 and starts the normal operation in the branch exhaust passage 3 at operation beginning time T0 (the time when the operation of the exhaust gas purification device 1 is started). In other words, the controller 10 controls the shutoff valve 4 to shut off the communication between the exhaust passage 100 on the engine side and the branch exhaust passage 2 and to establish the communication between the exhaust passage 100 on the engine side and the branch exhaust passage 3. For this reason, the exhaust gas flows into the branch exhaust passage 3. In addition, the controller 10 operates the first combustion device 6, the second combustion device 7 and the auxiliary air supply unit 15 inside the branch exhaust passage 2 subjected to the regeneration operation.

In the branch exhaust passage 2, the regeneration operation is performed in a period from the operation beginning time T0 to time T1, the normal operation is performed in a period from time T1 to time T4, and the regeneration operation is performed in a period from time T4 to time T5. The period from time T0 to time T1 and the period from time T4 to time T5 each correspond to the regeneration operation time WR. In addition, the period from time T1 to time T4 corresponds to the normal operation time WN.

In the branch exhaust passage 3, the normal operation is performed in a period from the operation beginning time T0 to time T2, the regeneration operation is performed in a period from time T2 to time T3, and the normal operation is performed in a period from time T3 to time T6. The period from time T3 to time T6 corresponds to the normal operation time WN. The period from time T2 to time T3 corresponds to the regeneration operation time WR.

During the normal operation, the nitrogen oxides contained in the exhaust gas are adsorbed onto the nitrogen oxide adsorbing material 5. The nitrogen oxides are thus eliminated from the exhaust gas. Furthermore, since the nitrogen oxide adsorbing material 5 has oxidation catalyst components, the carbon monoxide and hydrocarbons contained in the exhaust gas are oxidized. Therefore, the carbon monoxide and hydrocarbons are oxidized into carbon dioxide and water and rendered harmless. The carbon dioxide and hydrocarbons are thus eliminated from the exhaust gas.

As the nitrogen oxide adsorbing material 5 adsorbs the nitrogen oxides, the adsorption capability of the nitrogen oxide adsorbing material 5 lowers. Detaching the nitrogen oxides from the nitrogen oxide adsorbing material 5 is necessary to maintain the adsorption capability of the nitrogen oxide adsorbing material 5. For this reason, after the normal operation is performed for a constant time in the branch exhaust passage, the normal operation is stopped and the regeneration operation is performed, and then the normal operation is restarted.

During the regeneration operation, the controller 10 operates the first combustion device 6. By the operation of the first combustion device 6, the first mixture gas of fuel and air is generated in the first combustion zone A1, and the first mixture gas is burned. The controller 10 operates the first combustion device 6 so that the excess air ratio λ1 of the first mixture gas satisfies the relationship of $0.6<\lambda 1<1.0$. The first mixture gas is thus a mixture gas in an excess fuel state.

Since the first mixture gas is in an excess fuel state, the first burned gas contains carbon monoxide and hydrocarbons as unburned matters. The carbon monoxide and hydrocarbons serve as reducing agents for the nitrogen oxides. In addition, the temperature of the first burned gas has been raised by the heat of the combustion. Furthermore, since air is injected from the air nozzle 61, a gas flow is formed inside the branch exhaust passage to the exhaust downstream side. Therefore, the first burned gas is fed to the exhaust downstream side. As a result, a reducing atmosphere and a rising temperature atmosphere are generated around the nitrogen oxide adsorbing material 5 by virtue of the first burned gas.

Since the nitrogen oxide adsorbing material 5 is placed in the reducing atmosphere and the rising temperature atmosphere, the nitrogen oxides adsorbed onto the nitrogen oxide adsorbing material 5 are detached from the nitrogen oxide adsorbing material 5. The detached nitrogen oxides are mixed with the first burned gas generated in the first combustion zone A1 and fed to the exhaust downstream side.

The controller 10 operates the second combustion device 7 at the same time as or after operation of the first combustion device 6. By the operation of the second combustion device 7, a mixture gas of fuel and air is produced in the combustion zones A2 and A3. Air is further supplied to the third combustion zone A3 from the auxiliary air supply unit 15. For this reason, the excess air ratio in the second combustion zone A2 is different from the excess air ratio in the third combustion zone A3. Therefore, the mixture gas produced in the second combustion zone A2 is referred to as a second mixture gas, and the mixture gas produced in the third combustion zone A3 is referred to as a third mixture gas.

The first burned gas from the first combustion zone A1 reaches the second combustion zone A2. As a result, the second mixture gas and the first burned gas are burned and a second burned gas is produced in the second combustion zone A2. The second burned gas is fed to the exhaust downstream side by virtue of the gas flows generated by the air nozzles 61 and 71.

The nitrogen oxides have been eliminated from the second burned gas. When the first burned gas passes through the nitrogen oxide adsorbing material 5, the nitrogen oxides are detached from the nitrogen oxide adsorbing material 5 and fed to the second combustion zone A2 together with the first burned gas. The nitrogen oxides are burned in the second combustion zone A2 in an excess fuel atmosphere and reduced to nitrogen.

The controller 10 operates the auxiliary air supply unit 15 at the same time as or after operation of the second combustion device 7. By the operation of the auxiliary air supply unit 15, air is supplied to the exhaust downstream side of the air nozzle 151, and the third mixture gas is produced in the third combustion zone A3.

The second burned gas from the second combustion zone A2 also reaches the third combustion zone A3. As a result, the third mixture gas and the second burned gas are burned and a third burned gas is produced in the third combustion zone A3. The third burned gas is fed to the exhaust downstream side by virtue of the gas flows generated by the air nozzles 61 and 71 and the gas flow generated by the air nozzle 151.

The unburned matters produced in the combustion reaction have been eliminated from the third burned gas. The third combustion zone A3 is in an excess air atmosphere. Therefore, by virtue of the combustion in the third combustion zone A3, the unburned matters (carbon monoxide and hydrocarbons) are oxidized securely and rendered harmless.

The third burned gas is discharged from the exhaust outlet 2b of the branch exhaust passage 2, 3 subjected to the regeneration operation. From the third burned gas, the nitrogen oxides have been eliminated and the carbon monoxide and hydrocarbons, i.e., the unburned matters, have also been eliminated. In other words, a gas from which harmful substances have been eliminated is discharged from the branch exhaust passage 2 or 3.

(Operation Time in First and Second Combustion Devices)

Next, operation time in the combustion devices 6 and 7 will be described below in more detail.

The ignition time in the first combustion device 6 is set as described below. The ignition time of the ignition plug 63 is delayed from the operation beginning time of the air nozzle 61 and the fuel nozzle 62. Therefore, the combustion of the first mixture gas is started in a state in which the first mixture gas is distributed uniformly inside a space (the first combustion zone A1) containing the nitrogen oxide adsorbing material 5.

At the starting period of the internal combustion engine or the like, the first combustion device 6 is operated as described below. Here, the starting period is defined as a constant time period (a time period instead of a time point) from the beginning time point of starting in a machine. At the starting period of the internal combustion engine or the like, all the first combustion devices 6 inside the respective branch exhaust passages 2 and 3 are operated in an excess air condition different from the conditions after the starting. More accurately, all the first combustion devices 6 inside the branch exhaust passages subjected to the normal operation are operated. As a result, the first combustion devices 6 inside all the branch exhaust passages 2 and 3 including not only the branch exhaust passage 2 or 3 subjected to the regeneration operation but also the branch exhaust passages 2 and 3 subjected to the normal operation are operated. For this reason, the nitrogen oxide adsorbing material 5, the adsorption performance of which is lowered in a low temperature atmosphere, is warmed quickly from room temperature, whereby the adsorption performance of the nitrogen oxide adsorbing material 5 is maintained high from the starting period of the exhaust gas purification device 1. Furthermore, the unburned matters (carbon monoxide and hydrocarbons) generated at the starting period of the internal combustion engine or the like are oxidized and rendered harmless when passing through the branch exhaust passages.

Furthermore, at the starting period of the internal combustion engine or the like, the second combustion device 7 is operated as described below. At the starting period of the internal combustion engine or the like, all the second combustion devices 7 inside the respective branch exhaust passages 2 and 3 are operated. Even if the internal combustion engine or the like is operated in an excess air condition, black smoke and unburned matters (hydrocarbons and carbon monoxide) are discharged at the starting period of the internal combustion engine or the like. Such black smoke and unburned matters generated at the starting period are oxidized and rendered harmless in the combustion zones A2 and A3 by the operation of the second combustion device 7 operated in the excess air condition.

(Excess Air Ratio $\lambda$)

Next, the preferable ranges of the excess air ratios $\lambda 1$, $\lambda 2$ and $\lambda 3$ in the combustion zones A1, A2 and A3 will be described below specifically.

The preferable range of the excess air ratio $\lambda 1$ in the first combustion zone A1 is $0.6<\lambda 1<1.0$. The upper limit value ($\lambda 1=1.0$) of the excess air ratio $\lambda 1$ is determined since the first combustion zone A1 is maintained in a reducing atmosphere. In the case of $\lambda 1<1.0$, a reducing atmosphere is obtained. On the other hand, the lower limit value ($\lambda 1=0.6$) of the excess air ratio $\lambda 1$ is determined since the stability of the combustion is maintained. In the case of $\lambda 1>0.6$, the combustion becomes unstable, and the reducing atmosphere is not generated properly.

When the excess air ratio $\lambda 1$ is within the range of $0.6<\lambda 1<1.0$, the reducing atmosphere is generated effectively by the stable combustion. Therefore, in order that the amount of the energy required for the regeneration of the nitrogen oxide adsorbing material 5 is suppressed low, it is preferable that the excess air ratio $\lambda 1$ is controlled within the range of $0.6<\lambda 1<1.0$.

Figure 3:
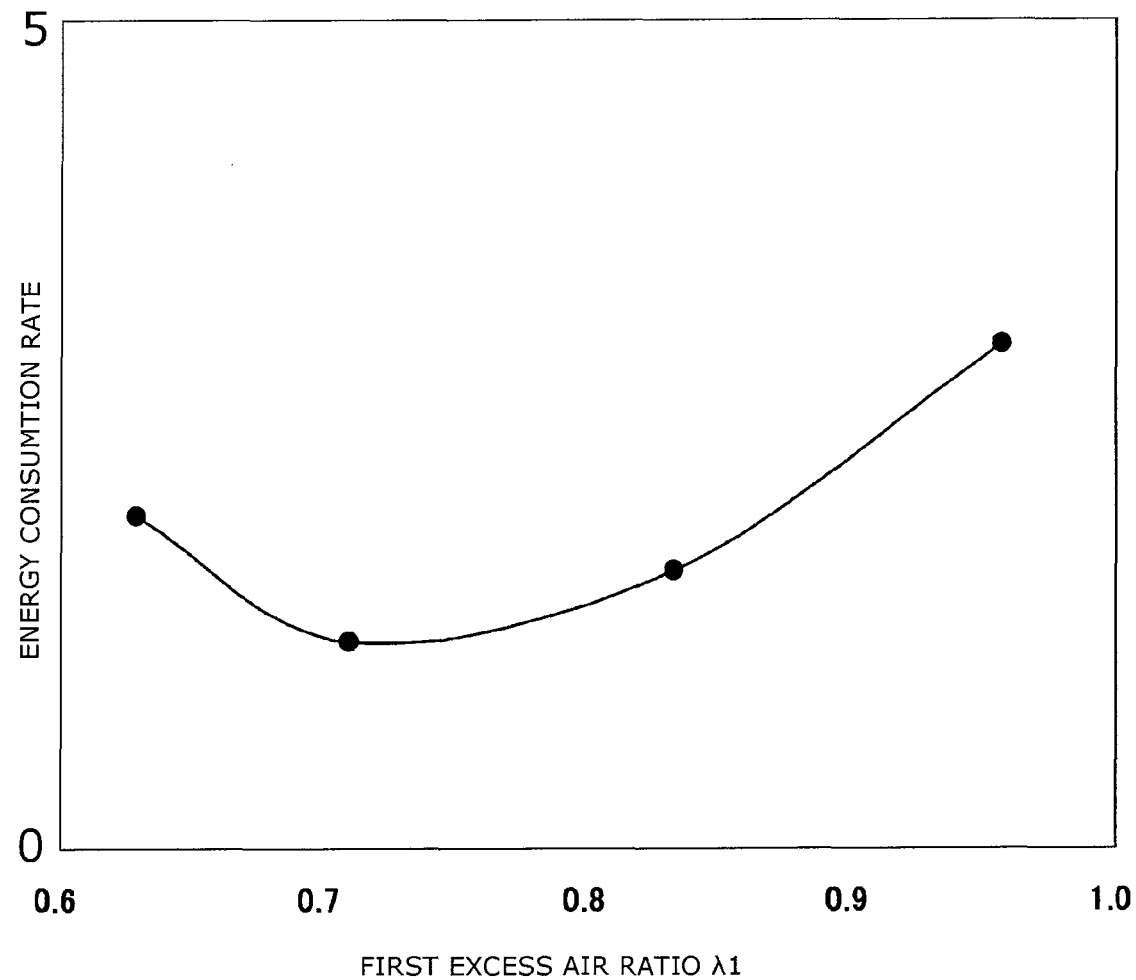
FIG. 3 is a graph showing the relationship between an excess air ratio and an energy consumption rate in a first combustion zone.

FIG. 3 is a graph showing the relationship between the excess air ratio $\lambda 1$ and an energy consumption rate at the time when the excess air ratio $\lambda 1$ is in the preferable range ($0.6<\lambda 1<1.0$). The energy consumption rate is defined as "the amount of fuel consumption of all the first combustion devices 6"/"the amount of fuel consumption of the internal combustion engine or the like." The fuel consumption of the internal combustion engine or the like is defined as the amount of the fuel consumed in the internal combustion engine or the like to which the exhaust gas purification device 1 is connected. The fuel consumption of all the first combustion devices 6 is defined as the amount of the fuel consumed in all the first combustion devices 6 provided for the exhaust gas purification device 1. Furthermore, the amount of heat of the fuel consumed corresponds to energy.

As shown in FIG. 3, when the excess air ratio $\lambda 1$ is a value close to $\lambda 1=0.7$, the energy consumption rate is particularly small, and the amount of the energy required for the regeneration of the nitrogen oxide adsorbing material 5 is suppressed to a lowest level.

The preferable range of the excess air ratio $\lambda 2$ in the second combustion zone A2 is $0.5<\lambda 2<1.0$. The upper limit value ($\lambda 1=1.0$) of the excess air ratio $\lambda 2$ is determined since the first combustion zone A1 is maintained in a reducing atmosphere. On the other hand, the lower limit value ($\lambda 2=0.5$) of the excess air ratio $\lambda 2$ is determined since the stability of the combustion is maintained.

Figure 4:
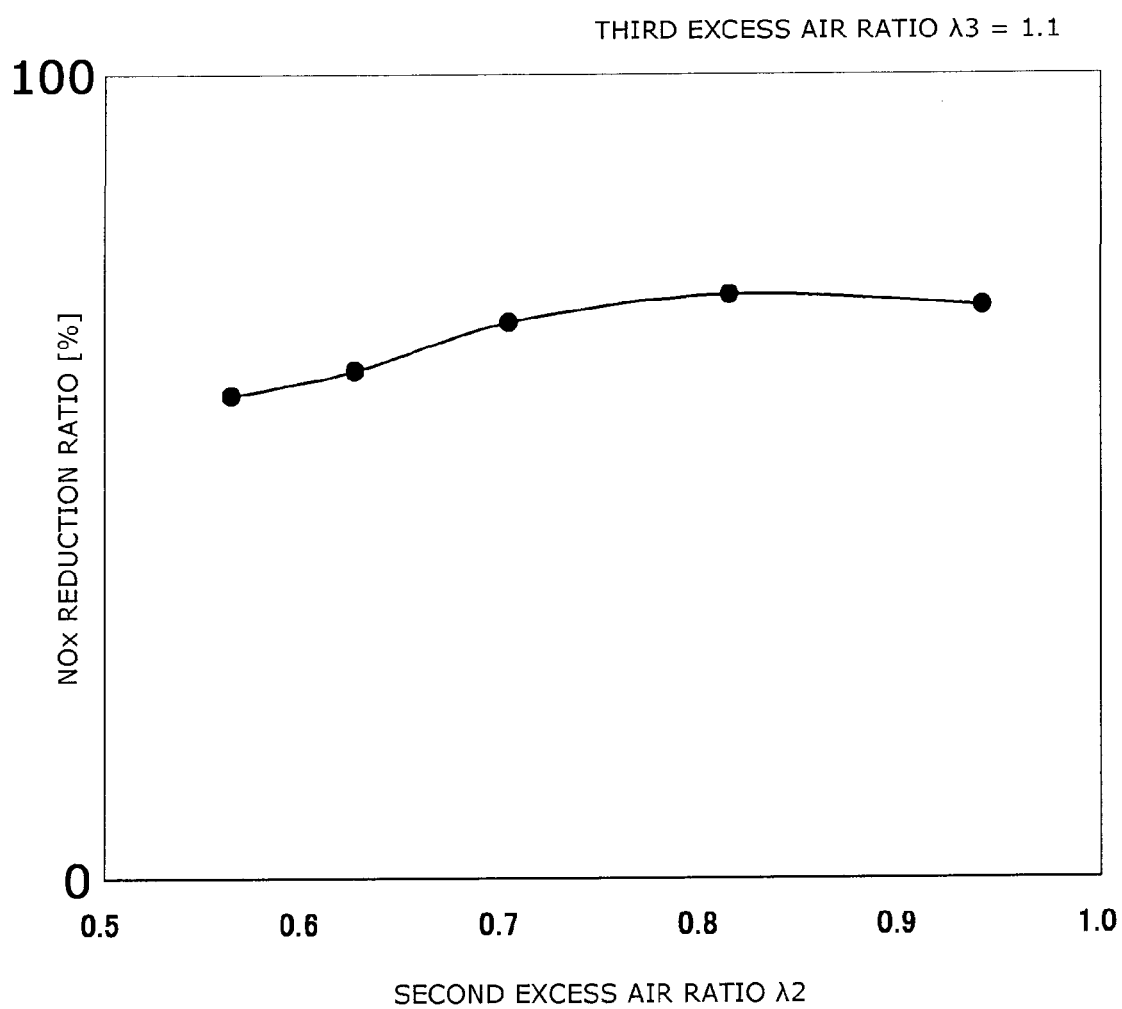
FIG. 4 is a graph showing the relationship between an excess air ratio and a NOx reduction ratio in a second combustion zone.
Figure 5:
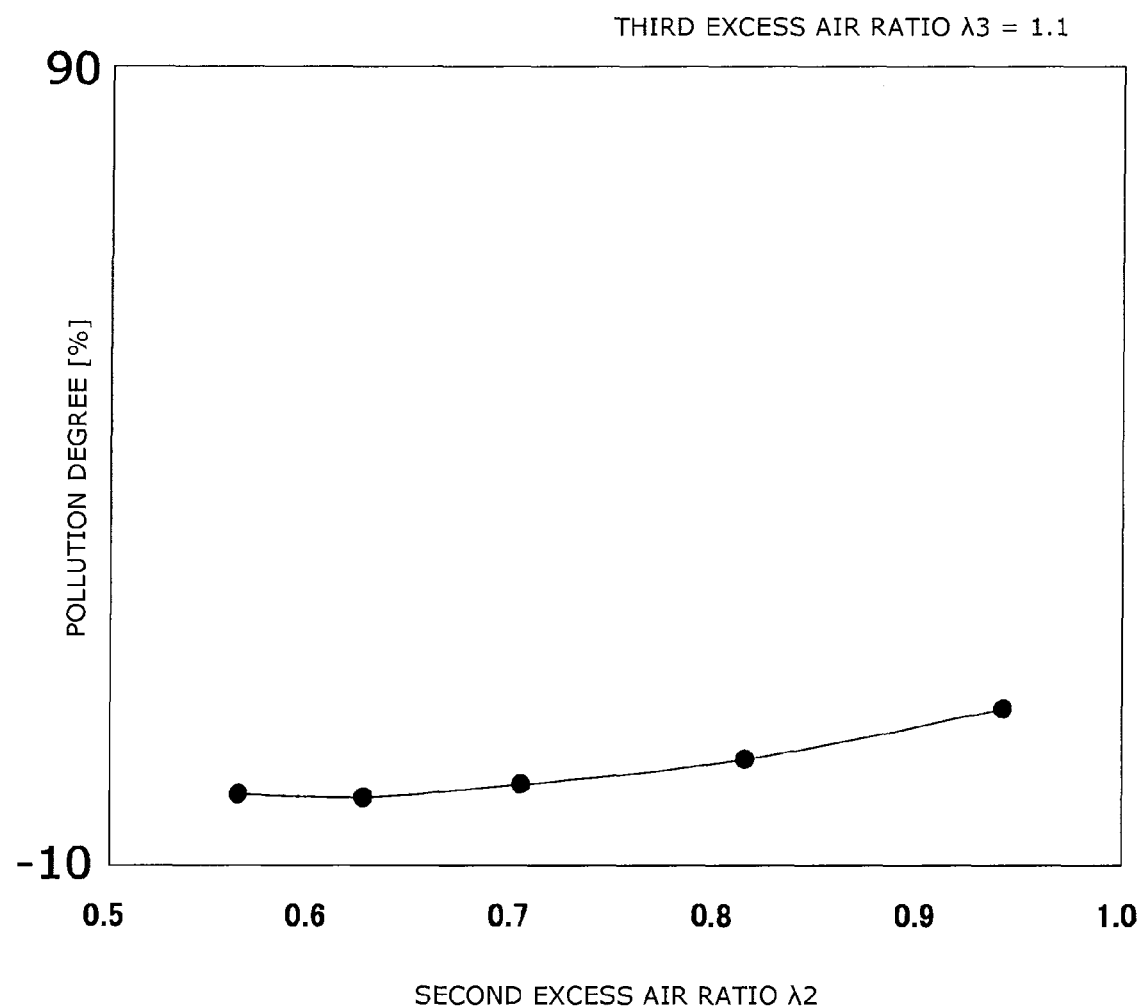
FIG. 5 is a graph showing the relationship between an excess air ratio and a pollution degree in the second combustion zone.

FIGS. 4 and 5 are graphs respectively showing the relationship (FIG. 4) between the excess air ratio $\lambda 2$ and a NOx reduction ratio and the relationship (FIG. 5) between the excess air ratio $\lambda 2$ and a pollution degree at the time when the excess air ratio $\lambda 2$ is in the preferable range ($0.5<\lambda 2<1.0$).

The data shown in FIGS. 4 and 5 is obtained by changing the excess air ratio $\lambda 2$ when the excess air ratio $\lambda 3$ is fixed at $\lambda 3=1.1$.

The NOx reduction ratio indicates "the NOx elimination amount using the exhaust gas purification device"/"the NOx amount contained in exhaust gas." The pollution degree (stipulated in JIS) is used as an index of "the concentration of black smoke contained in gas discharged from the exhaust gas purification device."

Furthermore, the data shown in FIGS. 4 and 5 is obtained in a state in which the auxiliary air supply unit 15 is not operated. Therefore, from the NOx reduction ratio and the pollution degree depending on the excess air ratio $\lambda 2$, the influence of the operation of the auxiliary air supply unit 15 (the excess air ratio $\lambda 3$) is excluded. Since the NOx reduction ratio is influenced by the combustion in an excess fuel atmosphere, the NOx reduction ratio is hardly influenced by the combustion in the third combustion zone A3 being in an excess air atmosphere. Therefore, a rough relationship between the NOx reduction ratio and the excess air ratio $\lambda 2$ is obtained from the data shown in FIGS. 4 and 5. On the other hand, since the pollution degree is influenced by the combustion in an excess air condition, the pollution degree is greatly influenced by the combustion in the third combustion zone A3. As a result, a rough relationship between the pollution degree and the excess air ratio $\lambda 2$ is obtained on the basis of the data (the excess air ratio $\lambda 3$) shown in FIGS. 6 and 7.

As shown in FIG. 4, when the excess air ratio $\lambda 2$ is within the range of $0.5<\lambda 2<1.0$, the NOx reduction ratio is approximately 60 to 70%.

Figure 6:
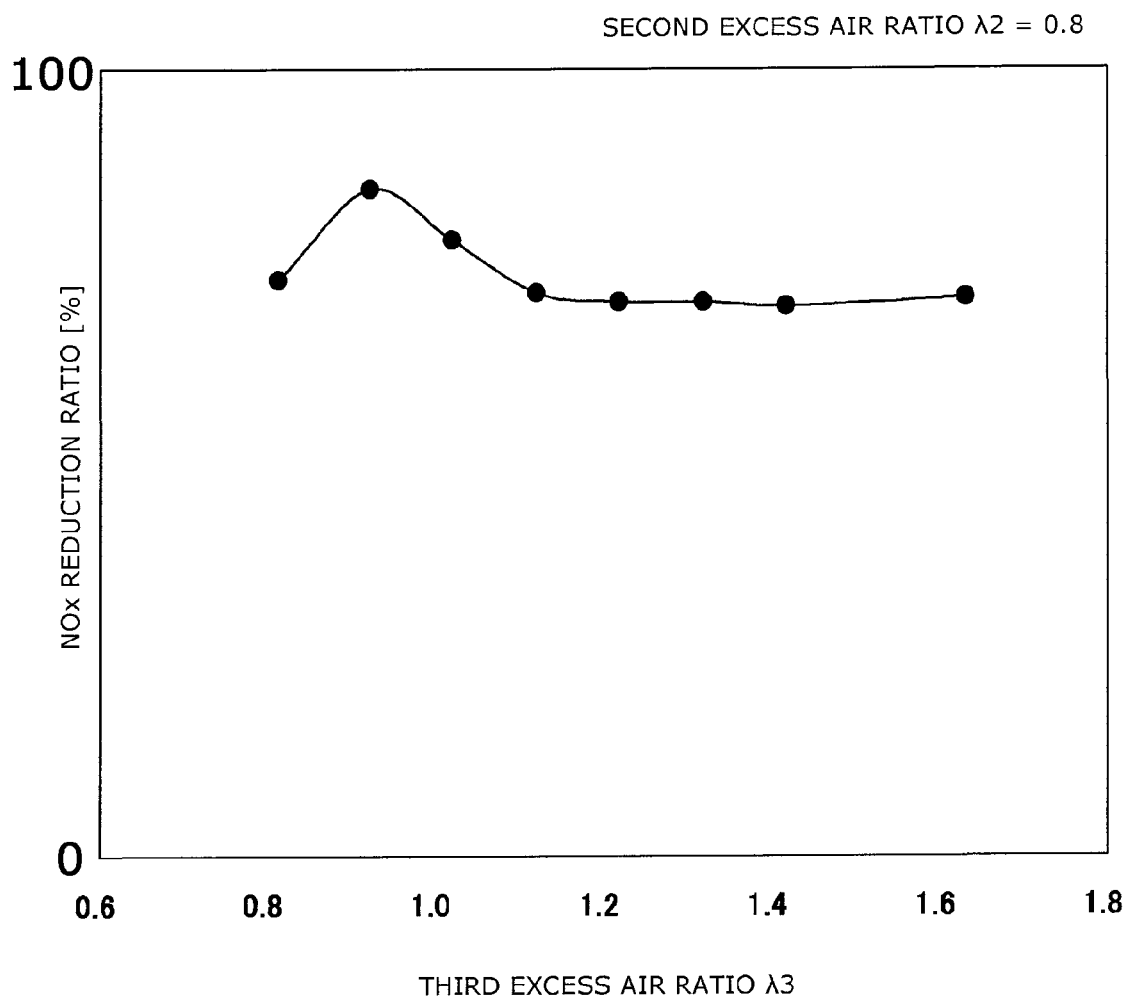
FIG. 6 is a graph showing the relationship between an excess air ratio and a NOx reduction ratio in a third combustion zone.
Figure 7:
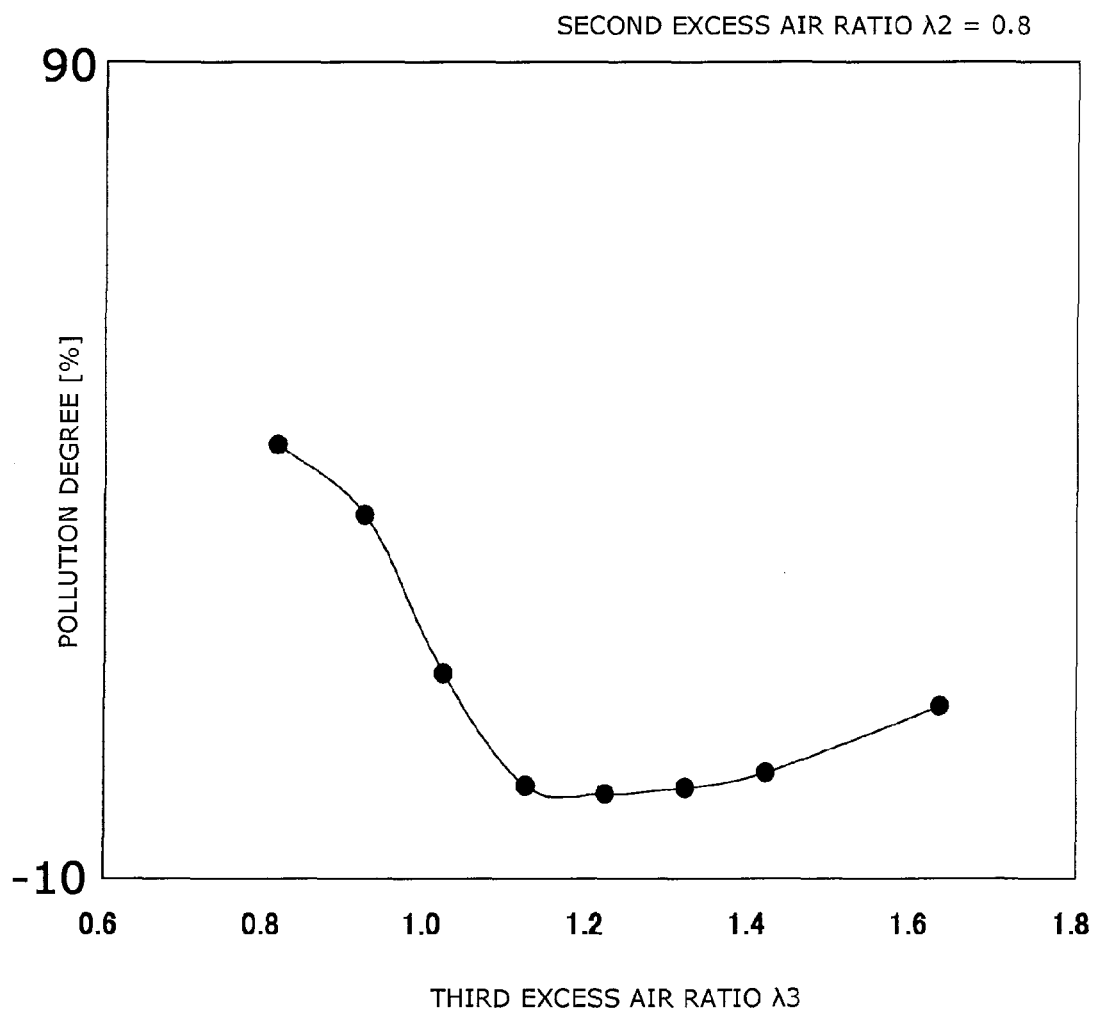
FIG. 7 is a graph showing the relationship between an excess air ratio and a pollution degree in the third combustion zone.

The preferable range of the excess air ratio $\lambda 3$ in the combustion zone A3 will be described below referring to FIGS. 6 and 7. FIG. 6 is a graph showing the relationship between the excess air ratio $\lambda 3$ in the third combustion zone A3 and a NOx reduction ratio. FIG. 7 is a graph showing the relationship between the excess air ratio $\lambda 3$ in the third combustion zone A3 and a pollution degree.

The data shown in FIGS. 6 and 7 is obtained by changing the amount of the air supplied from the auxiliary air supply unit 15 when the excess air ratio $\lambda 2$ is fixed at $\lambda 2=0.8$. In this case, the excess air ratio $\lambda 3$ is larger than the excess air ratio $\lambda 2$ since the air from the auxiliary air supply unit 15 is supplied.

As shown in FIG. 6, the NOx reduction ratio is almost unchanged as long as the excess air ratio $\lambda 3$ is maintained in an excess air state ($\lambda 3>1.0$). In other words, as described above, the excess air ratio $\lambda 3$ does not affect the NOx reduction ratio as long as the excess air ratio $\lambda 3$ is maintained in the excess air state.

As shown in FIG. 7, when the excess air ratio $\lambda 3$ is within the range of $1.0<\lambda 3<1.6$, the pollution degree is 10% or less. Therefore, for the purpose of decreasing the pollution degree of substances discharged, it is preferable that the excess air ratio $\lambda 3$ is controlled within the range of $1.0<\lambda 3<1.6$.

Effects of First Embodiment

The exhaust gas purification device 1 according to the first embodiment has the following effects.

Since the excess air ratio $\lambda 1$ is controlled within the range of $0.6<\lambda 1<1.0$, the amount of the energy required for the regeneration is suppressed low while the nitrogen oxide adsorbing material 5 can be regenerated sufficiently.

Since the excess air ratio λ2 is controlled within the range of 0.5<λ2<1.0 and the excess air ratio λ3 is controlled within the range of 1.0<λ3<1.6, the reduction ratio of nitrogen oxides in the exhaust gas purification device 1 is maintained high and the discharge amount of particulate matter is suppressed low.

Since the ignition time is delayed from the supply beginning time of fuel and air in the first combustion device 6, combustion is started in a state in which the mixture gas of the fuel and air has been distributed uniformly inside a space around the nitrogen oxide adsorbing material 5. Therefore, temperature rising, detachment and reduction reactions are started uniformly in the space around the nitrogen oxide adsorbing material 5, and the nitrogen oxides are reduced effectively.

Since the first combustion device 6 is operated in an excess air condition at the starting period of the internal combustion engine or the like, the temperature of the nitrogen oxide adsorbing material 5 is raised quickly, and the adsorption performance of the nitrogen oxide adsorbing material 5 is delivered properly from the starting period. In addition, the unburned matters (hydrocarbons and carbon monoxide) generated at the starting period of the internal combustion engine or the like are oxidized and rendered harmless when passing through the branch exhaust passages.

Since the second combustion device 7 is operated in an excess air condition at the starting period of the internal combustion engine or the like, the black smoke and unburned matters (hydrocarbons and carbon monoxide) generated at the starting period of the internal combustion engine or the like are oxidized and rendered harmless when passing through the branch exhaust passages.

Configuration of Second Embodiment

Figure 8:
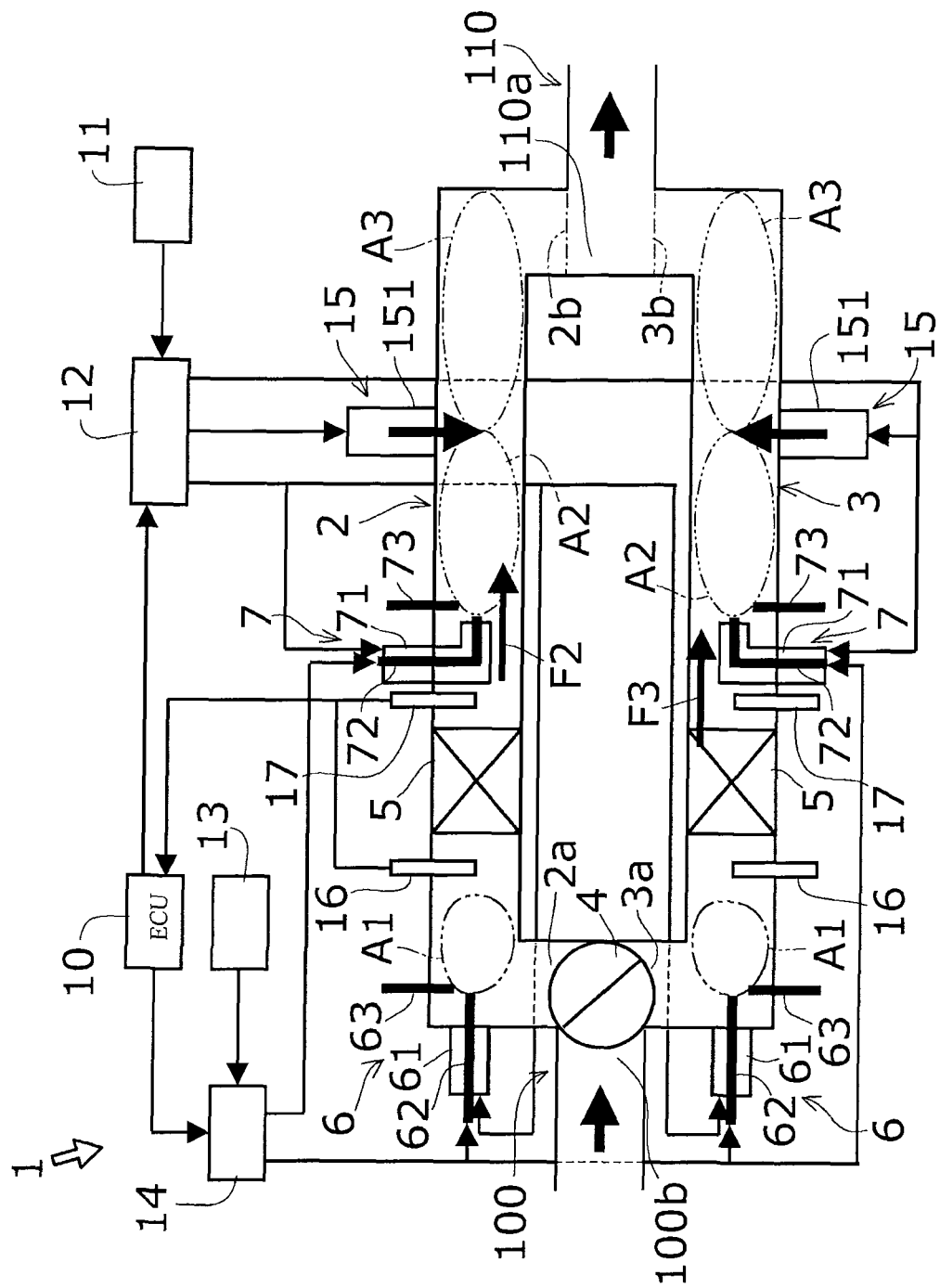
FIG. 8 is a schematic view showing an exhaust gas purification device (a second embodiment)

An exhaust gas purification device 1 according to a second embodiment will be described below referring to FIG. 8. The exhaust gas purification device 1 according to the second embodiment has a configuration in which a temperature detector (temperature sensor 16) and an adsorption amount detector (nitrogen oxide concentration sensor 17) are further provided for the exhaust gas purification device 1 according to the first embodiment. In addition, in the second embodiment, the detection information of the temperature sensor 16 and the nitrogen oxide concentration sensor 17 is used when the controller 10 controls the exhaust gas purification device 1.

The temperature detector detects the temperature of the nitrogen oxide adsorbing material 5 and is composed of the temperature sensor 16 detecting the temperature of the gas around the nitrogen oxide adsorbing material 5. The temperature of the gas around the nitrogen oxide adsorbing material 5 is equal to the temperature of the nitrogen oxide adsorbing material 5.

The temperature sensor 16 is disposed on the exhaust upstream side of the nitrogen oxide adsorbing material 5 and on the exhaust downstream side of the first combustion device 6. The temperature sensor 16 detects the temperature of the gas flowing into the nitrogen oxide adsorbing material 5.

The adsorption amount detector detects the amount of the nitrogen oxides adsorbed onto the nitrogen oxide adsorbing material 5. The adsorption amount detector is equipped with the nitrogen oxide concentration sensor 17 and an adsorption amount calculator (not shown).

The nitrogen oxide concentration sensor 17 detects the concentration of the nitrogen oxides contained in the gas. The nitrogen oxide concentration sensor 17 is disposed on the exhaust downstream side of the nitrogen oxide adsorbing material 5 and on the exhaust upstream side of the second combustion device 7 in each of the branch exhaust passages 2 and 3. The nitrogen oxide concentration sensor 17 detects the concentration of the nitrogen oxides in the gas passing through the nitrogen oxide adsorbing material 5.

The adsorption amount calculator calculates the estimated value of the amount of the nitrogen oxides adsorbed onto the nitrogen oxide adsorbing material 5 on the basis of the information on the concentration of the nitrogen oxides detected by the nitrogen oxide concentration sensor 17. The calculation uses a phenomenon in which as the adsorption amount of the nitrogen oxides increases, the amount of the nitrogen oxides adsorbed onto the nitrogen oxide adsorbing material 5 decreases, and the concentration of the nitrogen oxides passing through the nitrogen oxide adsorbing material 5 increases. The adsorption amount calculator is composed of a dedicated circuit or a part of the controller 10.

Operation of Second Embodiment

Next, the control relating to the temperature detector (temperature sensor 16) and the adsorption amount detector (nitrogen oxide concentration sensor 17) in the operation of the exhaust gas purification device 1 will be described below. The operation of the second embodiment is the same as the operation of the first embodiment except for the control described here.

A first difference in control is in the operation control of the first combustion device 6 during the regeneration operation. In the first embodiment, when the first combustion device 6 is operated during the regeneration operation, the air supply unit (air nozzle 61), the fuel supply unit (fuel nozzle 62) and the ignition unit (ignition plug 63) are all operated. On the other hand, in the second embodiment, the ignition unit (ignition plug 63) is not operated in some cases.

In the second embodiment, the controller 10 operates the air supply unit (air nozzle 61) and the fuel supply unit (fuel nozzle 62) of the first combustion device 6 that is operated at the start of the regeneration operation. As a result, the first mixture gas of combustion and air is supplied to the first combustion zone A1.

The controller 10 judges whether the temperature of the nitrogen oxide adsorbing material 5 is high or low with respect to a predetermined temperature on the basis of the temperature detection information of the temperature detector (temperature sensor 16) in the branch exhaust passage subjected to the regeneration operation. Here, the predetermined temperature is defined as a temperature at which the reaction for oxidizing the fuel contained in the first mixture gas is started on the nitrogen oxide adsorbing material 5 without causing ignition. Since the nitrogen oxide adsorbing material 5 contains catalyst components having an oxidation action, the nitrogen oxide adsorbing material 5 performs this kind of action. In addition, the nitrogen oxide adsorbing material 5 is warmed by the exhaust gas passing through the branch exhaust passage, and the temperature thereof is higher than room temperature.

In the case that the temperature of the nitrogen oxide adsorbing material 5 is judged to be lower than the predetermined temperature, the controller 10 operates the ignition unit (ignition plug 63). On the other hand, in the case that the temperature of the nitrogen oxide adsorbing material 5 is judged to be not lower than the predetermined temperature, the controller 10 does not operate the ignition unit (ignition plug 63). In the case that the temperature of the nitrogen oxide adsorbing material 5 is higher than the predetermined temperature, when the first mixture gas is supplied to the first combustion zone A1, a combustion reaction occurs spontaneously on the nitrogen oxide adsorbing material 5.

A second difference in control is in the control relating to the normal operation time WN. In the first embodiment, the duration of the normal operation time WN is fixed. On the other hand, in the second embodiment, the duration of the normal operation time WN is variable.

In the second embodiment, the controller 10 judges whether the adsorption amount on the nitrogen oxide adsorbing material 5 is high or low with respect to a predetermined amount on the basis of the adsorption amount detection information of the adsorption amount detector (nitrogen oxide concentration sensor 17) in the branch exhaust passage subjected to the normal operation. The predetermined amount is a value determined arbitrarily according to which the manufacturer of the exhaust gas purification device 1 judges that the adsorption performance of the nitrogen oxide adsorbing material 5 has reached its lower limit.

In the case that the adsorption amount on the nitrogen oxide adsorbing material 5 is judged to be not less than the predetermined amount, the controller 10 stops the normal operation in the branch exhaust passage subjected to the normal operation and starts the regeneration operation. In the case that the adsorption amount on the nitrogen oxide adsorbing material 5 is judged to be less than the predetermined amount, the controller 10 continues the normal operation in the branch exhaust passage subjected to the normal operation. In this way, the normal operation time WN changes on the basis of the adsorption amount detection information of the adsorption amount detector (nitrogen oxide concentration sensor 17).

Effects of Second Embodiment

The exhaust gas purification device 1 according to the second embodiment further has the following effects.

In the case that the temperature of the nitrogen oxide adsorbing material 5 is higher than the temperature at which the oxidation catalyst components of the nitrogen oxide adsorbing material 5 spontaneously start the oxidation reaction of the fuel, the ignition unit (ignition plug 63) of the first combustion device 6 is not operated. Therefore, while the first combustion device 6 is used to function as a device generating a rising temperature atmosphere and a reducing atmosphere, and the service life of the ignition unit (ignition plug 63) can be extended.

In the case that the adsorption amount on the nitrogen oxide adsorbing material 5 is more than the predetermined amount, the normal operation is stopped and the regeneration operation is started. Therefore, while the nitrogen oxides are prevented from being discharged, the implementation time of the normal operation can be extended to its maximum limit, and the frequency of implementing the regeneration operation can be minimized. In other words, the amount of the energy required for the regeneration operation in the exhaust gas purification device 1 can be minimized. Furthermore, since combustion is always started in a state in which the mixture gas has reached the nitrogen oxide adsorbing material 5, the temperature rising, detachment and reduction reactions are started uniformly in the space around the nitrogen oxide adsorbing material 5, and the nitrogen oxides are reduced effectively.

Configuration of Third Embodiment

An exhaust gas purification device 1 according to a third embodiment will be described below referring to FIG. 9. In the exhaust gas purification device 1 according to the third embodiment, the nitrogen oxide adsorbing material contains one of Pt, Rh and Pd as a component thereof. Furthermore, the auxiliary air supply unit 15 provided for the exhaust gas purification device 1 according to the first embodiment is eliminated from the exhaust gas purification device 1 according to the third embodiment. In addition, the second combustion device 7 is controlled to supply the second mixture gas in an excess air state. In the first embodiment, the second combustion device 7 supplies the second mixture gas in an excess fuel state.

In the third embodiment, devices reducing the nitrogen oxides to nitrogen are the nitrogen oxide adsorbing material 5 serving as a reducing catalyst and the first combustion device 6 for providing a rising temperature atmosphere and a reducing atmosphere. Since the nitrogen oxide adsorbing material 5 contains one of the noble metals Pt, Rh and Pd as a component thereof, the nitrogen oxide adsorbing material 5 reduces the nitrogen oxides to nitrogen when placed in a high-temperature reducing atmosphere. The first combustion device 6 operates so that the nitrogen oxide adsorbing material 5 is placed in the high-temperature reducing atmosphere.

For this reason, in the third embodiment, the second combustion region A2 filled with the reducing atmosphere is not required to be provided on the exhaust downstream side of the nitrogen oxide adsorbing material 5. In the first embodiment, for the purpose of generating the reducing atmosphere in the second combustion region A2, the controller 10 performs control so that the second mixture gas in an excess fuel state is supplied to the second combustion region A2 from the second combustion device 7 and burned. Therefore, in the third embodiment, a combustion zone equivalent to the third combustion zone A3 being in an excess air state should only be provided on the exhaust downstream side of the nitrogen oxide adsorbing material 5.

Figure 9:
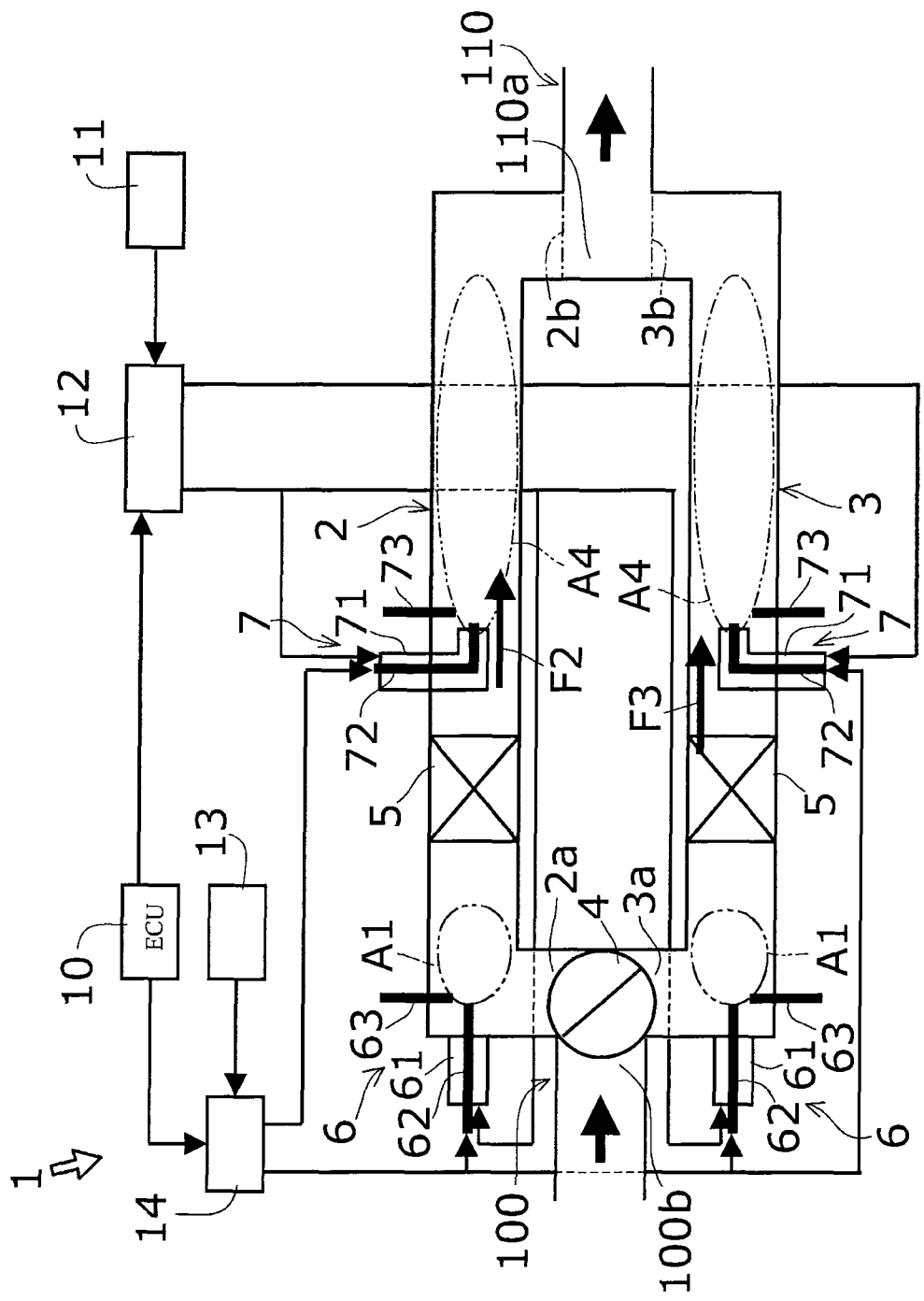
FIG. 9 is a schematic view showing an exhaust gas purification device (a third embodiment)
Figure 10:
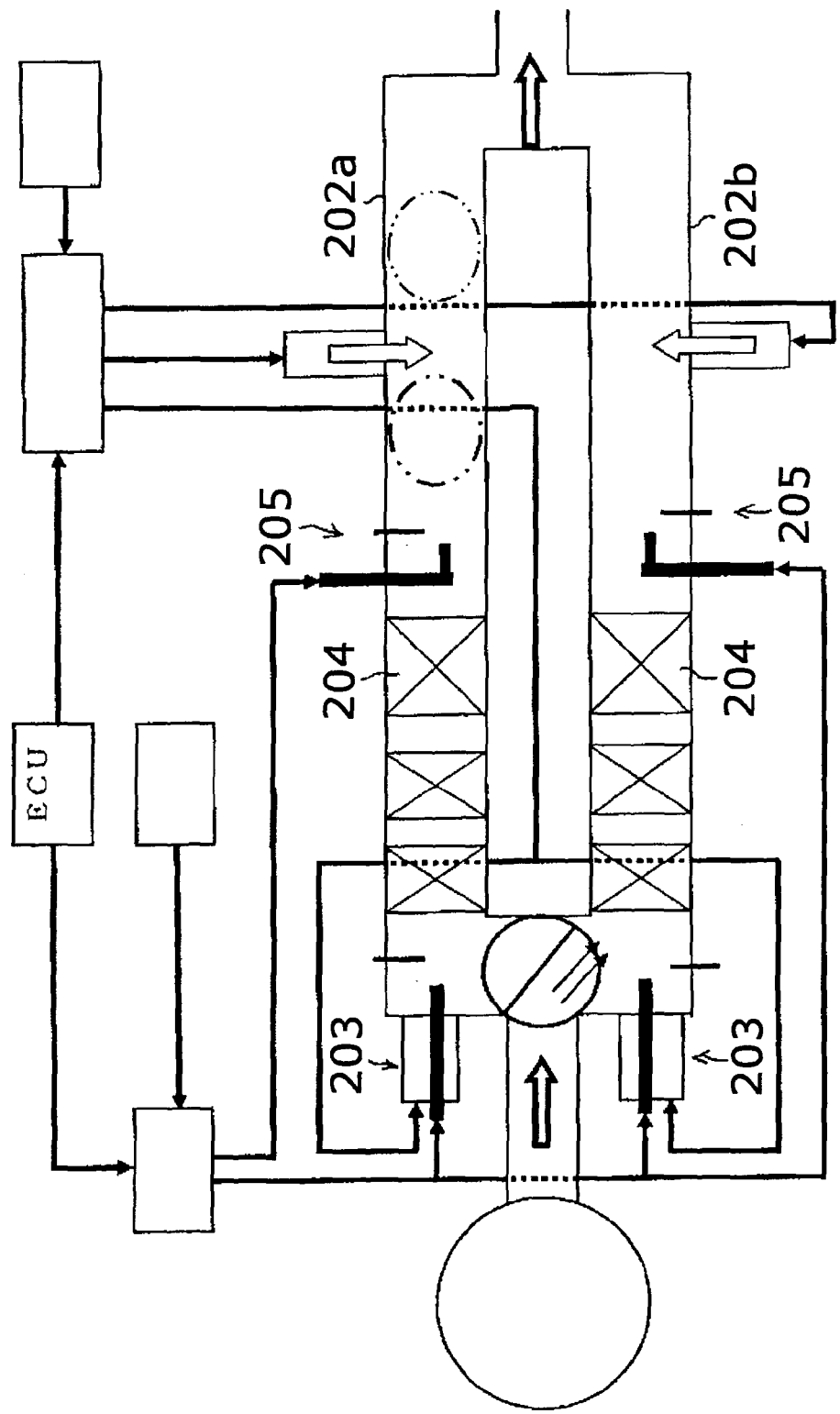
FIG. 10 is a schematic view showing the conventional exhaust gas purification device.

As shown in FIG. 9, the controller 10 controls the second combustion device 7 so that a fourth combustion zone A4 being in an excess air state is generated on the exhaust downstream side of the nitrogen oxide adsorbing material 5. In other words, the second combustion device 7 is controlled so that the excess air ratio $\lambda 4$ of the mixture gas supplied from the second combustion device 7 is larger than 1. The excess air ratio $\lambda 4$ is maintained within the range of $1.0<\lambda 4<1.6$. The range of the excess air ratio $\lambda 4$ is the same as the range of the excess air ratio $\lambda 3$ in the third combustion zone A3 in the first embodiment.

Effects of Third Embodiment

Since the nitrogen oxide adsorbing material 5 contains one of Pt, Rh and Pd as a component thereof, it is not necessary to provide a combustion device reducing the nitrogen oxides. Furthermore, since the second combustion device 7 causes a combustion reaction in an excess air condition ($1.0<\lambda 4<1.6$), the unburned matters (carbon monoxide and hydrocarbons) are also rendered harmless. As a result, the amount of energy consumption is decreased in comparison with the case in which the combustion reaction is caused in an excess fuel atmosphere to reduce the nitrogen oxides.

INDUSTRIAL APPLICABILITY

The present invention is applicable to a device purifying exhaust gas discharged from internal combustion engines, such as diesel engines, gas engines, gasoline engines or gas turbine engines, or burning appliances, such as combustion furnaces and boilers.

The invention claimed is:

1. A method for controlling an exhaust gas purification device, wherein the exhaust gas purification device comprises:
a plurality of branch exhaust passages connected to an exhaust passage on the engine side of an internal combustion engine or a burning appliance;
an exhaust gas shutoff unit switching between allowing and shutting off the flow of the exhaust gas into the respective branch exhaust passages from the exhaust passage on the engine side by opening or closing the exhaust inlets of the respective branch exhaust passages;
a nitrogen oxide adsorbing material, disposed inside each of the respective branch exhaust passages, temporarily adsorbing nitrogen oxides in an excess air atmosphere, and detaching the adsorbed nitrogen oxides in a rising temperature atmosphere or a reducing atmosphere;
a first combustion device disposed on the exhaust upstream side of the nitrogen oxide adsorbing material inside each of the respective branch exhaust passages and comprising an air supply unit, a fuel supply unit and an ignition unit for generating the rising temperature atmosphere or the reducing atmosphere by burning fuel; and
a second combustion device disposed on the exhaust downstream side of the nitrogen oxide adsorbing material inside each of the respective branch exhaust passages and comprising an air supply unit, a fuel supply unit and an ignition unit,
wherein there are normal operation and regeneration operation performed in the respective branch exhaust passages,
the method comprising the steps of:
allowing the flow of the exhaust gas into the branch exhaust passage subjected to the normal operation by the switching of the exhaust gas shutoff unit during the normal operation;
operating the first combustion device and the second combustion device while the exhaust gas is prevented from flowing into the branch exhaust passage subjected to the regeneration operation by the switching of the exhaust gas shutoff unit during the regeneration operation;
controlling the ratio of fuel and air within the range of a predetermined lower limit value $<\lambda 1<1.0$, where $\lambda 1$ is an excess air ratio, the fuel and the air being supplied from the first combustion device inside the branch exhaust passage subjected to the regeneration operation, wherein the predetermined lower limit value corresponds to minimum value at which the stability of the combustion is maintained;
delaying an ignition time in the first combustion device from a supply beginning time of fuel and air in the first combustion device inside the branch exhaust passage subjected to the regeneration operation; and
detecting a temperature of the nitrogen oxide adsorbing material inside the branch exhaust passage subjected to the regeneration operation by a temperature detector disposed on the exhaust upstream side of the nitrogen oxide adsorbing material; and
operating the ignition unit of the first combustion device inside the branch exhaust passage subjected to the regeneration operation when the temperature of the nitrogen oxide adsorbing material is lower than a temperature at which an oxidation reaction of the fuel on the nitrogen oxide adsorbing material is started.

2. The method according to claim 1,
wherein the exhaust gas purification device further comprises:
an auxiliary air supply unit on the exhaust downstream side of the air supply unit of the second combustion device inside each of the branch exhaust passages,
wherein a space from the air supply unit of the second combustion device to the auxiliary air supply unit is defined as a fuel rich combustion zone, and wherein a space within the exhaust downstream side of the auxiliary air supply unit is defined as a fuel lean combustion zone,
the method further comprising:
controlling the amounts of the fuel and air supplied from the first combustion device and the second combustion device and the amounts of air supplied from the auxiliary air supply unit so that the excess air ratio $\lambda 2$ in the gas inside the fuel rich combustion zone is within the range of $0.5<\lambda 2<1.0$ and the excess air ratio $\lambda 3$ in the gas inside the fuel lean combustion zone is within the range of $1.0<\lambda 3<1.6$ inside the branch exhaust passage subjected to the regeneration operation.

3. The method according to claim 1,
wherein the nitrogen oxide adsorbing material contains one of Pt, Rh and Pd as a component thereof,
the method further comprising:
controlling the amounts of the fuel and air supplied from the first combustion device and the second combustion device so that the excess air ratio $\lambda 4$ of the gas inside the space within the exhaust downstream side of the air supply unit in the second combustion device is within the range of $1.0<\lambda 4<1.6$ inside the branch exhaust passage subjected to the regeneration operation.

4. The method according to claim 1, further comprising:
operating the second combustion device inside each of the branch exhaust passages at the starting period of the internal combustion engine or the burning appliance.

5. The method according to claim 1, further comprising:
operating the first combustion device in an excess air condition inside each of the branch exhaust passages at the starting period of the internal combustion engine or the burning appliance.

* * * * *